Figure 1:
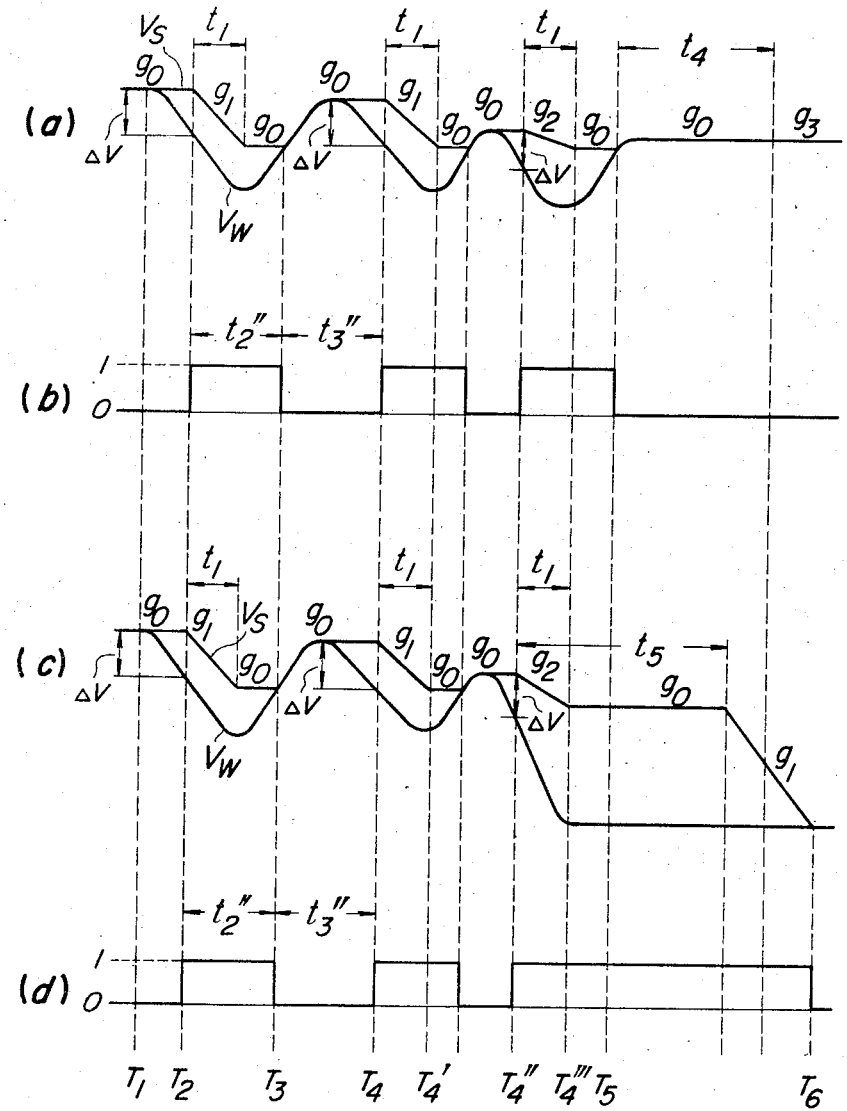

United States Patent [19]
Okamoto et al.

[11] 3,724,903
[45] Apr. 3, 1973

[54] ANTI-SKID CONTROL SYSTEM FOR VEHICLES

[75] Inventors: Atsutoshi Okamoto, Toyohashi; Akio Sugiura, Nagoya, both of Japan

[73] Assignee: Nippondenso Co., Ltd., Aichi-ken, Japan

[22] Filed: Sept. 29, 1971

[21] Appl. No.: 184,671

[30] Foreign Application Priority Data

Nov. 16, 1970 Japan..............................45/100935

[52] U.S. Cl. ................303/21 P, 303/20, 303/21 BE
[51] Int. Cl. ................................................B60t 8/08
[58] Field of Search....188/181 C; 303/20, 21; 317/5; 324/160–161; 340/263

[56] References Cited

UNITED STATES PATENTS 3,653,727  4/1972  Kullberg et al.......................303/21 P Primary Examiner—Milton Buchler
Assistant Examiner—Stephen G. Kunin
Attorney—Cushman, Darby & Cushman

[57] ABSTRACT

An anti-skid control system for vehicles, wherein a plurality of timer circuits comprise a counter circuit for counting clock pulses having a fixed frequency and a plurality of flip-flop circuits for detecting predetermined finite time durations from the output signals of the counter circuit.

1 Claim, 5 Drawing Figures

ANTI-SKID CONTROL SYSTEM FOR VEHICLES

The present invention relates generally to anti-skid control systems for vehicles and more particularly to an anti-skid control system for vehicles which is designed to prevent the skidding of the vehicle induced by the locking of the wheels that would occur when the braking pressure exceeds a value determined by the friction coefficient between the wheels and a road surface upon braking of the running vehicle.

With anti-skid control systems of the type described above, while a real time control is desirable in which the vehicle speed is detected so as to maintain the wheel speed at a value which is, for example, lower than the vehicle speed by about 20 percent, the detection of the vehicle speed is not an easy matter. For instance, while a special wheel designed to contribute in no way to the driving and change of direction of an automobile and moreover to have no braking pressure applied thereto may be installed as a means of detecting the vehicle body speed, this is not a satisfactory solution from the aspect of practical use since it ruins the external appearance of the vehicle, for example.

In order to solve these difficulties, predictive controls have hitherto been propose to prevent the locking of the wheel by detecting the wheel speed. That is, a pattern is predetermined which is designed to decrease the wheel speed so as to prevent the wheel from locking under an excessively large braking pressure and this pattern is then compared with the actual wheel speed so that when there is a tendency for the wheel to lock the braking pressure is forcibly reduced to prevent the locking of the wheel. The effectuation of such a predictive control requires that the conditions such as the state of rise of the wheel speed after the braking pressure has been forcedly reduced is decided by means of a plurality of timer circuits in accordance with predetermined finite times so that the pattern is modified according to the decision obtained so as to effect the required predictive control to adjust the braking pressure to always suit the friction coefficient between the wheel and the road surface, thereby preventing the locking of the wheel and hence the skidding of the vehicle.

With the conventional system of this type employing a plurality of timer circuits to effect the required predictive control, while there has been no inconvenience due to the predictive control per se, each of the timer circuits comprises a resistor and a capacitor. Thus, with the conventional system employing timer circuits each comprising a resistor and a capacitor, the following various difficulties have heretofore been encountered:

1. If a large capacitor is used, its capacitance changes with the external temperature, namely the change in capacitance is in the order of ±10 percent over the temperature range from −50° to 85° C to which the vehicle could be subjected. This would make it absolutely impossible to ensure an accurate detection of time duration.

2. To obtain a delay time of the order of 1 to 3 seconds, it is necessary to employ a large capacitor and this in turn results in a circuit construction that would require a large mounting space, thus preventing an impediment in the way of employing integrated circuits to achieve miniaturization of the circuitry. In this case, while it is possible to obtain the same delay time by employing a smaller capacitor and a resistor having a correspondingly larger resistance value, if the resistance value is selected to be too large, it will increase considerably when the external temperature thus making it impossible to effect the accurate detection of time is elevated duration. Hence, the capacitance of the capacitor cannot be selected to be excessively small.

3. Any attempt to charge a large capacitor in a short period of time causes a large current flow in the circuitry in a short period of time. This, for example, produces a large potential difference between two points of the copper foil on a printed circuit board thereby causing misoperation of the circuitry.

4. The use of a plurality of timer circuits requires a considerable time and labor for the adjustment of the timer circuits, since the timer circuits must be adjusted individually. Furthermore, while this adjustment is effected by changing the resistance values of the resistors, variable resistors cannot be employed for these resistors in consideration of the external temperature, humidity, vibrations to which the vehicle body is subjected and so on and thus fixed resistors are employed. However, since the selection of such fixed resistors is rather difficult, the result is variations in the delay characteristics among different systems.

It is therefore the main object of the present invention to provide an anti-skid control system for vehicles including lock detecting means for comparing a predetermined pattern designed to reduce the wheel speed to prevent the locking of the wheel under an excessively large braking pressure with the actual wheel speed so as to generate a braking pressure reducing signal for forcibly reducing the braking pressure, and braking pressure modulating means for receiving the braking pressure reducing signal from the lock detecting means to reduce the braking pressure, a combination comprising a plurality of timer circuits for generating command signals to change said pattern of said lock detecting means in accordance with a predetermined time durations after the generation of said braking pressure reducing signal, and a pattern modification circuit for receiving the command signals from said plurality of timer circuits to change said pattern, wherein said plurality of timer circuits are composed of a counter circuit for counting clock pulses having a fixed frequency and a plurality of flip-flop circuits for detecting predetermined finite time durations from the output signals of said counter circuit.

According to the present invention, there are improved effects, as follows:

1. A long delay time period can be readily obtained without using delay time setting capacitors.

2. The absence of capacitors ensures the detection of time durations with an improved accuracy against variations in the external temperature. Particularly, when the clock pulse oscillator comprises a tuning fork controlled oscillator or the like, the accuracy of time duration detection can be readily maintained at a value which is on the order of ±0.2 percent against variations in the external temperature ranging from −30° to 85° C and this accuracy is higher by ten times than that which is obtainable when delay capacitors are used.

3. The absence of capacitors also prevents any large charging current from flowing in a short period of time and this in turn prevents occurrence of any misoperation due to a large potential difference developed between the two points of copper foil wiring on a printed circuit board.

4. The respective delay time periods of a plurality of timer circuits can be adjusted fully automatically by simply adjusting the oscillation frequency of a single clock pulse oscillator, so that as compared with the timer circuits of the type comprising a resistor and a capacitor and designed to be adjusted separately the adjustment is simplified considerably and the number of steps required for the adjustment is also reduced to a considerable degree.

5. By employing integrated circuits at least for the counter circuit and the flip-flop circuits, the circuit construction can be made smaller and compact and at the same time accurate delay time characteristics can be ensured even with increase in the external temperature since no resistor having a value higher than 10 kilo-ohm is generally used according to the integrated circuit techniques.

Figure 2:
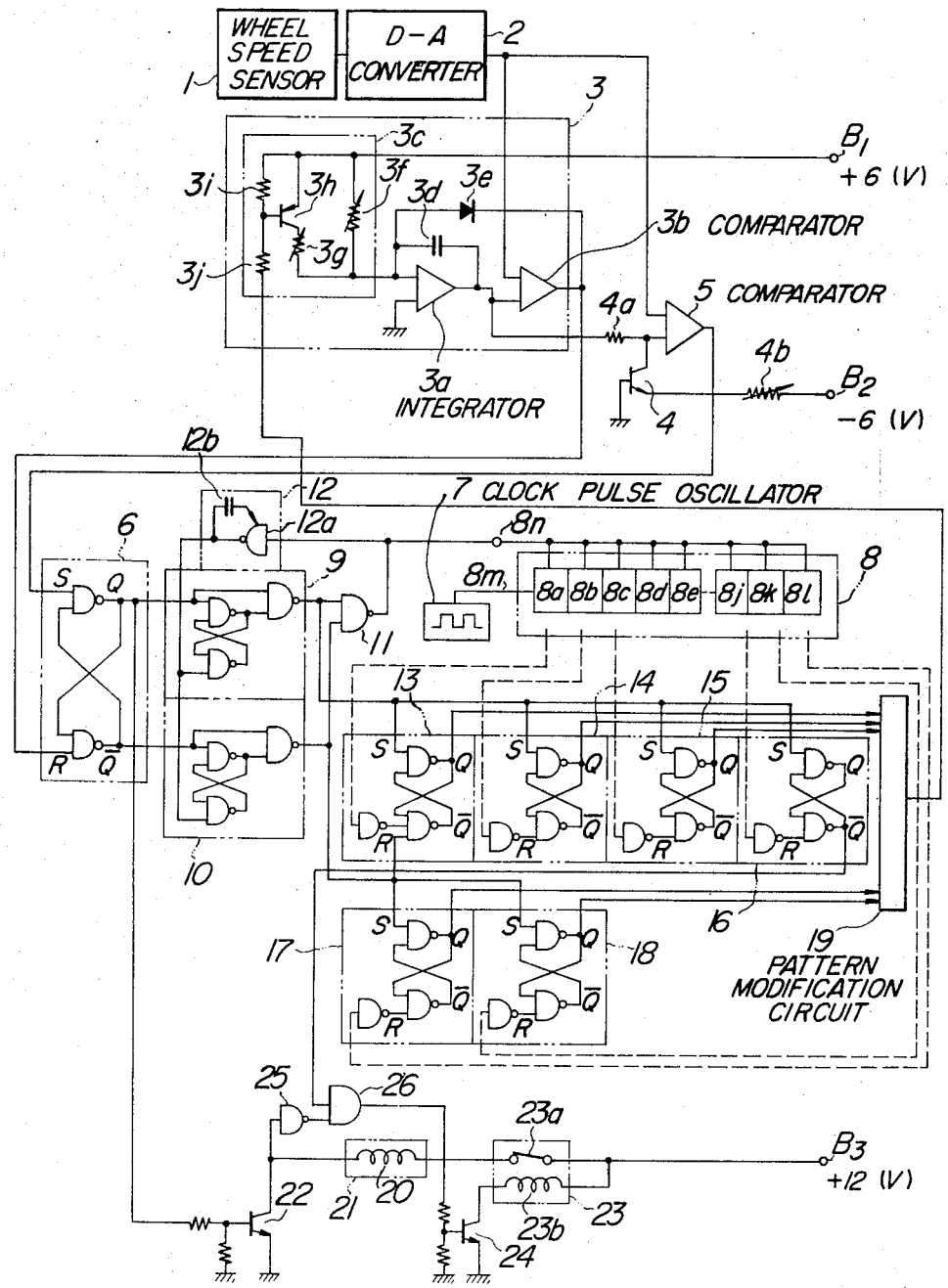

The above and other objects and advantages of the present invention will be readily apparent from the following detailed description of a preferred embodiment of the present invention when taken in conjunction with the accompanying drawings, in which:

FIGS. 1(a), 1(b), 1(c) and 1(d) are characteristic diagrams showing an embodiment of the control pattern for the vehicle anti-skid control system of the present invention; and FIG. 2 is an electrical wiring diagram showing an embodiment of the electrical circuitry of the system according to the present invention.

The wheel speed control pattern will now be explained with reference to FIGS. 1(a) to 1(d). FIGS. 1(a) and 1(c) illustrate the change with time of a wheel speed $V_W$ and a reference wheel speed $V_S$, respectively, while FIGS. 1(b) and 1(c) represent the braking pressure reducing signal for reducing the braking pressure. Briefly, the wheel speed $V_W$ is controlled such that when the braking pressure is applied, the wheel speed $V_W$ drops with a deceleration which is dependent upon the amount of braking pressure applied, while the reference wheel speed $V_S$ decreases according to a predetermined control pattern. Thus, when the wheel speed $V_W$ goes below the reference wheel speed $V_S$ by a value in excess of a speed difference $\Delta V$ (3 Km/h, for example), a braking pressure reducing signal is produced so that braking pressure modulating means is actuated to forcibly reduce the braking pressure applied to the wheel. As the wheel speed $V_W$ eventually picks up speed again and becomes equal to the reference wheel speed $V_W$, the braking pressure reducing signal is terminated and a braking pressure restoring signal is then produced to reapply the braking pressure to the wheel. The control pattern of the reference wheel speed $V_S$ is such that the reference wheel speed $V_S$ gradually decreases in response to the deceleration of the wheel in accordance with predetermined decelerations corresponding to $g_0$ (1.0 g), $g_1$ (3.6 g), $g_2$ (1.8 g) and $g_3$ (0.9 g), where g is the gravity of the earth.

Assuming now that the brake pedal is pressed to apply the braking pressure to the wheel at a time $T_1$ in FIG. 1(a), the wheel speed $V_W$ drops with a deceleration corresponding to the braking pressure, while the reference wheel speed $V_S$ decreases with the predetermined deceleration $g_0$. Then, as the wheel speed $V_W$ drops below the reference wheel speed $V_S$ by the speed deference $\Delta V$ at a time $T_2$, a braking pressure reducing signal ("1" signal) is produced as shown in FIG. 1(b), thereby actuating the braking pressure modulating means to forcibly reduce the braking pressure applied to the wheel. During a delay time $t_1$ (50 microseconds, for example) from the generation of the braking pressure reducing signal at the time $T_2$, the reference wheel speed $V_S$ drops with either the deceleration $g_1$ or $g_2$. In this case, whether the reference wheel speed $V_S$ drops with $g_1$ or $g_2$ is dependent on the history of the braking pressure reducing signal during the preceeding one cycle. Thus, if a duration time $t_2''$ of the braking pressure reducing signal in that one cycle is shorter than a predetermined delay time $t_2$ (100 microseconds, for example) and a duration time $t_3''$ of the braking pressure restoring signal is shorter than a delay time $t_3$ (80 microseconds, for example), the reference wheel speed $V_S$ drops with $g_2$, while it drops with $g_1$ in other circumstances. On the other hand, the wheel speed $V_W$ drops with the present deceleration $g_0$ after it has dropped with either the deceleration $g_1$ or $g_2$ during the delay time $t_1$ and this condition will be maintained until such time that the braking pressure restoring signal ("O" signal) is produced. This braking pressure restoring signal will be produced when the wheel speed $V_W$, picking up speed again upon the generation of the braking pressure reducing signal, becomes equal to the reference wheel speed $V_S$ at the time $T_3$. Thereafter, as the wheel speed $V_W$ picks up speed further, the reference wheel speed $V_S$ also increases along with the wheel speed $V_W$. During the next cycle following the generation of the braking pressure at the time $T_3$, at a time $T_4$ the braking pressure restoring signal is terminated and the braking pressure reducing signal is produced again. Following the regeneration of the braking pressure reducing signal, the set deceleration of the reference wheel speed $V_S$ assumes either $g_1$ or $g_2$ depending upon the results of the comparisons of a duration time $t_2''$ of the braking pressure reducing signal and a duration time $t_3''$ of the braking pressure restoring signal in the previous cycle with the delay times $t_2$ and $t_3$, respectively, as previously mentioned (In FIG. 1, the set deceleration is shown assuming $g_1$ during the time period between the times $T_4$ and a $T'_4$). A similar operation is repeated in the succeeding cycles so that when the braking pressure reducing signal is produced and at the same time the set deceleration of the reverence wheel speed $V_S$ is set to $g_0$ at a time $T_5$ in the last cycle and when this condition continues in excess of a delay time $t_4$ (1 second, for example), the set deceleration is changed to $g_3$.

The relationship between the wheel speed $V_W$ and the reference wheel speed $V_S$ shown in FIG. 1C and the braking pressure reducing signal shown between the times $T_1$ and $T_4'''$ in FIG. 1(d) are the same with those shown in FIGS. 1(a) and 1(b), respectively, with FIG. 1(c) showing the case where the wheel is locked due to an abrupt change in the condition of a road surface while the brakes are being applied, such as when the friction coefficient between the wheel and the road surface changes from a low to a high value. In the case of FIG. 1(c), even if the braking pressure reducing signal is produced at the time $T_4''$ as shown in FIG. 1(d), this does not cause the wheel speed to pick up speed again and thus after the time $T_4''$ the braking pressure reducing signal is continuously produced. When the braking pressure reducing signal remains on in excess of a delay time $t_5$ (1.5 seconds, for example) (the braking pressure reducing signal is designed so that usually it is not continually produced in excess of 0.5 seconds), it will be assumed from the standpoint of safety that the vehicle has come to a complete standstill, that is, the wheel speed has been reduced to zero, thus changing the set deceleration of the reference wheel speed $V_S$ from $g_0$ to $g_1$ to produce the braking pressure restoring signal at a time $T_6$.

As described hereinbefore, five timer circuits are required to respectively set the delay times $t_1$, $t_2$, $t_3$, $t_4$ and $t_5$ in order to cause the wheel speed $V_W$ to decrease according to the control pattern of the reference wheel speed $V_S$ shown in FIG. 1. Furthermore, a further timer circuit is required in addition to the said five timer circuits, since the braking pressure reducing signal is predetermined to usually remain on less than 0.5 seconds so that if the braking pressure reducing signal is continuously produced in excess of the delay time $T_6$, it is to be determined that there is some abnormal condition in the circuitry and thus forcibly cut off the supply of current to the electromagnetic coil of braking pressure modulating means. Accordingly, the total number of the required timer circuits is six.

Next, the electric circuitry including the aforesaid six timer circuits will be explained with reference to FIG. 2. In the figure, numeral 1 designates a wheel speed sensor for producing a pulse signal having a frequency proportional to the wheel speed, which may comprise a magnetic toothed wheel connected to the wheel and a transducer consisting of a permanent magnet and a coil wound therearound, the transducer being disposed on the outer periphery of the toothed wheel. Numeral 2 designates a D-A converting circuit designed to effect the D-A conversion of the pulse signal from the wheel speed sensor 1 to produce a DC voltage proportional to the wheel speed. Numeral 3 designates a reference voltage generating circuit comprising an integrating circuit 3a, a comparator 3b, a deceleration setting circuit 3c, a capacitor 3d and a diode 3e, whereby when the DC output voltage (hereinafter referred to as a wheel speed voltage) of the D-A converting circuit 2 is on the increase or in a given steady state, the comparator 3b causes the capacitor 3d to be charged through the diode 3e so as to make the output voltage of the integrating circuit 3a become equal to the wheel speed voltage, whereas when the wheel speed voltage is on the decrease the comparator 3b interrupts the charging of the capacitor 3d and discharges the charge on the capacitor 3d through a transistor 3h in accordance with the set deceleration dependent upon the deceleration setting circuit 3c. This produces a voltage (hereinafter referred to as a reference wheel speed voltage) corresponding to the reference wheel speed at the terminals of the capacitor 3d. The deceleration setting circuit 3c comprises a variable resistors 3f and 3g, the transistor 3h and bias resistors 3i and 3j, whereby the deceleration $g_0$ is set by the variable resistor 3F and the deceleration $g_1$ is set by the variable resistor 3g. On the other hand, once $g_1$ is set, the decelerations $g_2$ and $g_3$ will be automatically set in accordance with the recurrent frequency by which the transistor 3h is turned on and off and this setting is effected by a pattern modification circuit which will be explained later. Numeral 4a designates a resistor for subtracting from the reference wheel speed voltage a voltage value corresponding to the speed difference $\Delta V$ explained in connection with FIG. 1 and also a current regulator circuit employing a transistor 4 is provided to maintain the current flowing through the resistor 4a at a predetermined value, with the value of the current flowing through the resistor 4a being dependent upon the resistance value of the variable resistor 4b. Numeral 5 designates a comparator for comparing two voltages, i.e., the wheel speed voltage and a voltage equivalent to the reference wheel speed voltage minus the voltage value corresponding to the speed difference $\Delta V$, so that when the former becomes smaller than the latter the output signal of the comparator 5 changes from "1" to "0," thereby setting a set-reset flip-flop circuit 6 (hereinafter referred to as a SRFF) thus producing the braking pressure reducing ("1") signal at its output Q. When the wheel speed voltage rises as a result of the generation of the pressure reducing signal so that the wheel speed voltage becomes greater than or equal to the reference wheel speed voltage, the output of the comparator 3b changes from the "1" signal to a "0" signal or a negative signal so that the SRFF 6 is reset and the signal at the output Q changes from "1" to "0," thereby terminating the braking pressure reducing signal and generating the braking pressure restoring signal. Of course, if there is the condition, where wheel speed voltage $\geq$ (the reference wheel speed voltage — the voltage corresponding to the speed difference $\Delta V$), the output of the comparator 5 changes from the "0" signal to a "1" signal. However, the output signals of the comparator 3b and the comparator 5 will never assume the "0" state simultaneously. Thus, the braking pressure reducing signal and the braking pressure restoring signal will be respectively produced as a "1" signal and a "0" signal at the output Q of the SRFF 6. Designated as $B_1$ is a power supply terminal of +6 V and $B_2$ designates a power supply terminal of —6 V. Numeral 7 designates a clock pulse oscillator which comprises, for examples, a tuning fork controlled oscillator designed to generate a clock pulse having a frequency of 2KHz. Numeral 8 designates a binary counter circuit of the binary type employing twelve J-K flip-flops (hereinafter referred to as JKFF's) 8a, 8b, 8c, — 8k and 8l with 8n designating a reset terminal for restoring all the outputs of JKFF's 8a, 8b, 8c, — 8k and 8l to the "0" state. The application of a "1" signal to the reset terminal 8n causes all the output signals of the JKFF's 8a, 8b, 8c, — 8k and 8l to assume the "0" state. Numeral 9 designates a SRFF having a NAND gate connected to the output terminal thereof; 10 another SRFF also having a NAND gate connected to the output terminal thereof; 11 an inverter employing a NAND gate; 12 a delay circuit comprising a NAND gate 12a and a capacitor 12b (1000 PF). Thus, at the moment a "1" signal is produced at the output Q of the SRFF thus producing the braking pressure reducing signal, the SRFF 9, inverter 11 and delay circuit 12 produce at the output of the SRFF 9 a pulse signal (a "0" signal) having a very short pulse width (of 7 $\mu$ sec, for example) which is dependent on the capacitance of the capacitor 12b so that this "0" signal sets the SRFF's 13, 14, 15 and 16 for setting the delay times $t_1$, $t_2$, $t_5$ and $t_6$, respectively, and at the same time a "1" signal which is the "0" signal produced at the output of the SRFF 9 and inverted by the inverter 11 is applied to the reset terminal of the binary counter circuit 8 to reset the counter circuit 8. In this connection, since the duration of the aforesaid pulse signal having the very short pulse width of 7 $\mu$ sec, for example, is exceedingly short as compared with the delay times $t_1$, $t_2$, $t_5$, and $t_6$, its pulse width is considered to be zero. Thus, the SRFF's 13, 14, 15 and 16 produce at their respective Q outputs a "1" signal for the periods of their respective delay times $t_1$, $t_2$, $t_5$ and $t_6$ after which periods the signal changes from "1" to "0." In this case, the setting of the delay timers $t_1$, $t_2$, $t_5$ and $t_6$ depends upon which output terminal(s) of the binary counter circuit 8 is connected to the input terminal of a NAND circuit provided on the reset side of each of the SRFF's 13, 14, 15 and 16. For example, in order to provide a delay time of 80 $\mu$ sec with a clock pulse having the frequency of 2KHz, the gate input of any given SRFF is connected to the output terminals of the sixth bit JKFF and the eighth bit JKFF of the binary counter circuit 8 so that the output signal of the SRFF assumes the "0" state after the lapse of 80 $\mu$ sec, thereby providing the desired time delaying characteristic of 80 $\mu$ sec. On the other hand, at the instant the signal at the output Q of the SRFF 6 assumes the "0" state thereby producing the braking pressure restoring signal, the SRFF 10, inverter 11 and delay circuit 12 produce at the output of the SRFF 10 a pulse signal (a "0" signal) having a very short pulse width (of 7 $\mu$ sec, for example) so that this "0" signal sets the SRFF's 17 and 18 for setting the delay times $t_3$ and $t_4$, respectively, and at the same time a "1" which is the "0" signal produced at the output of the SRFF 10 and inverted by the inverter 11 is applied to the reset terminal 8n of the binary counter circuit 8 to reset the counter circuit 8. In this case, the pulse width of the pulse signal having said very short pulse width of 7 $\mu$ sec, for example, is considered to be zero, since the duration of the pulse signal is exceedingly short as compared with the delay times $t_3$ and $t_4$. Consequently, a "1" signal is produced at the respective Q outputs of the SRFF's 17 and 18 for the respective predetermined periods of the delay times $t_3$ and $t_4$ after which periods the signal changes from "1" to "0." In this case, the setting of the delay times $t_3$ and $t_4$ depends upon which output terminal(s) of the binary counter circuit 8 is connected to the input terminal of a NAND circuit provided on the reset side of each of the SRFF's 17 and 18 as previously described with the setting of the delay times $t_1$ et al. As described hereinbefore, the pattern modification circuit 19 performs, in the manner described in connection with FIG. 1, the operation required for suitably changing the set decelerations of the reference wheel speed according to the delay times $t_1$, $t_2$ and $t_5$ which are to be counted from the moment the braking pressure reducing signal is generated and the delay times $t_3$ and $t_4$ which are to be counted from the moment the braking pressure restoring signal is generated. For example, in order to set the deceleration of the reference wheel speed to $g_2$ and $g_3$, respectively, if the resistance of the variable resistor 3g is set such that the deceleration is set to $g_1$ (3.6 g) when the transistor 3h in the deceleration setting circuit 3c is turned on and off at the frequency of 2KHz by means of pulse signals having a fixed pulse width, the deceleration can be set to $g_2$ (1.8 g) by simply turning the transistor 3h on and off at a frequency of 1 KHz by means of pulse signals having a fixed pulse width, while the deceleration can be similarly set to $g_3$ by turning the transistor 3h on and off at a frequency of 500 Hz.

Numeral 20 designates braking pressure modulating means adapted to be electromagnetically operated and the mechanical construction of the braking pressure modulating means is not shown excepting its electromagnetic coil 21. When the electromagnetic coil 21 is not energized, the artificial braking operation due to the depression of the brake pedal by the driver of a vehicle is not prevented in any way, thus permitting the normal braking operation. When a current is supplied to the electromagnetic coil 21 by virtue of the braking pressure reducing signal, the electromagnetic force of the electromagnetic coil 21 actuates a three-way valve, for example, and hence servo means is actuated so as to forcibly reduce the braking pressure applied to the wheel even if the driver is pressing the brake pedal. Numeral 22 designates a power transistor for interrupting the supply of current to the electromagnetic coil 21 with the transistor base being connected to the output of the SRFF 6 through a resistor. Numeral 23 designates a relay having its normally closed contacts 23a connected between the end of the electromagnetic coil 21 on the power supply side and a power supply terminal $B_3$ (+12V) and its relay coil 23b connected to serve as the collector load of a transistor 24. Numeral 25 designates an inverter comprising a NAND gate; 26 an AND gate for producing the logical product of the output from the inverter 25 and the output from the $\overline{Q}$ output of the SRFF 16 and the output of the AND gate 26 is connected to the base of the transistor 24. With the arrangement this far described, it is prearranged such that the braking pressure reducing signal will not be continuously produced in excess of 0.5 seconds, for example, when the circuitry is in the normal condition. However, should a "1" signal (the braking pressure reducing signal) be produced continually at the Q terminal of the SRFF 6 owing to its failure, for example, the "0" signal at the $\overline{Q}$ output of the SRFF 16 which usually remains on for the period of $t_6$ (2 seconds) from the occurrence of the braking pressure reducing signal now changes from "0" to "1" as the braking pressure reducing signal remains on in excess of 2 seconds. This produces a "1" signal at the output of the AND gate 26 and this "1" signal then renders the transistor 24 conductive to energize the relay coil 23b of the relay 23 causing the normally closed contacts 23a to open. When this happens, the supply of current to the electromagnetic coil 21 is forcibly interrupted thereby making it possible for the driver to apply the braking pressure to the wheel as he desires by pressing the brake pedal.

It should be noted that the present invention is in no way limited to the specific embodiment described herein and many other forms of the embodiment will occur to those skilled in the art. For example, the lock detecting means for comparing a predetermined pattern with the actual wheel speed to generate the braking pressure reducing signal is not limited to that of the illustrated embodiment which is designed to set the reference wheel speed. Instead, it may effectively take various other forms of the type known in the art, such as one which is designed to produce the required braking pressure reducing signal when the peripheral deceleration of the wheel reaches a predetermined deceleration. Furthermore, the clock pulse oscillator 7 may comprise an unstable multivibrator.

What we claim is:

1. In an anti-skid control system for vehicles including lock detecting means for comparing a predetermined pattern for reducing the wheel speed to prevent the locking of the wheel under an excessively large braking pressure with the actual wheel speed so as to generate a braking pressure reducing signal for forcibly reducing the braking pressure and braking pressure modulating means for receiving the braking pressure reducing signal from the lock detecting means to reduce the braking pressure, a combination comprising a plurality of timer circuits for generating command signals to change said pattern of said lock detecting means in accordance with predetermined time durations after the generation of said braking pressure reducing signal, and a pattern modification circuit for receiving the command signals from said plurality of timer circuits to change said pattern, wherein said plurality of timer circuits comprise a counter circuit for counting clock pulses having a fixed frequency and a plurality of flip-flop circuits for detecting predetermined finite time durations from the output signals of said counter circuit.

* * * * *